United States Patent [19]
van Namen

[11] Patent Number: 6,006,875
[45] Date of Patent: Dec. 28, 1999

[54] ELECTRICALLY-TUNABLE VIBRATION ABSORBERS

[76] Inventor: Frederik T. van Namen, 25570 Serena Dr., Valencia, Calif. 91355

[21] Appl. No.: 09/052,535

[22] Filed: Mar. 31, 1998

[51] Int. Cl.$^6$ ....................................................... F16F 7/10
[52] U.S. Cl. ...................... 188/378; 267/140.14; 248/638
[58] Field of Search ..................................... 267/136, 137, 267/140.11, 140.14; 188/378, 379, 267; 248/550, 638

[56] References Cited

U.S. PATENT DOCUMENTS

| | | | |
|---|---|---|---|
| 5,427,362 | 6/1995 | Schilling et al. | 267/140.14 |
| 5,713,438 | 2/1998 | Rossetti et al. | 188/378 |

*Primary Examiner*—Robert J. Oberleitner
*Assistant Examiner*—Mariano Sy
*Attorney, Agent, or Firm*—J. E. McTaggart

[57] ABSTRACT

An ETVA (electrically-tunable vibration absorber) has a vibratable mass with a mechanical spring suspension supplemented by an electromagnetic spring simulation that can be adjusted electrically to vary the self-resonant frequency of the vibratable mass and tune it to a disturbing frequency that is to be suppressed. A flux path from the electromagnet traverses an air gap between a pair of oppositely-facing matching magnetic pole arrays, one of which is attached to the vibratable mass while the other pole array is substantially attached to the object structure that is being treated to suppress vibration. The two interfacing arrays are configured in mirror-image relationship as seen in cross-section, and are held by the spring suspension so as to be mutually aligned under a quiescent condition and to move relative to each other under vibration only in a designated direction so that the gap separation distance remains substantially constant and thus the flux density at the poles remains substantially constant and unmodulated, resulting in high efficiency due to minimal eddy current losses.

18 Claims, 5 Drawing Sheets

ELECTRICALLY-TUNABLE VIBRATION ABSORBERS

FIELD OF THE INVENTION

The present invention relates to the field of passive vibration control, and more particularly it relates to TVAs (Tuned Vibration Absorbers) of the type wherein a mass is vibratably supported via spring means attached to an object structure such as machinery framework that is prone to vibrational disturbance such as from internal unbalance of reciprocating parts. In a TVA, the mass is caused to vibrate at a resonant frequency in response to excitation received from the vibrational disturbance and reacts on the object structure in a manner to suppress the vibrational disturbance; the present invention relates to ETVA's (electrically-tunable vibration absorbers), i.e. TVA's whose resonant frequency can be varied via electrical adjustment means.

BACKGROUND OF THE INVENTION

TVA's (tuned vibration absorbers) are conventionally fixed-tuned and are utilized to reduce unwanted vibration of an object structure at a particular disturbing frequency, e.g. a constant motor speed or reciprocating parts vibrating at a constant frequency.

A fixed-tuned TVA is typically a spring/mass resonator consisting of a vibratable mass attached indirectly to the object structure by a spring support or suspension means that allows the mass to vibrate at the disturbing frequency in response to excitation received from the object structure, in an interactive manner that reduces the vibration amplitude of the object structure by absorbing energy therefrom.

The spring material in the suspension means is characterized by a physical property known as spring modulus, sometimes referred to as spring constant or spring rate, defined as force/deflection distance, where the force can be regarded either as an applied deflecting force applied externally or as an opposite and equal restoring force exerted internally by the spring. A related physical property, compliance, defined as the displacement of a linear mechanical system under a unit force, is inversely related to spring modulus.

The spring modulus of the suspension means in combination with the mass determines a natural resonant frequency of vibration, which is typically tuned to be equal or close to the frequency of the disturbing vibration, hence the name TVA (tuned vibration absorber).

In a linear-motion type TVA the mass is constrained laterally so it can move only along a straight line path and is constrained longitudinally by the spring means, e.g. coil springs or flexures, so that under vibration it reciprocates only along a longitudinal path, typically coinciding with the central axis of a coaxial structure.

In a beam type TVA a support beam of spring material is cantilever-mounted at its base end onto the object structure and carries at the opposite end an enlarged head portion constituting the mass which can thus vibrate in an arcuate travel path, defined by flexure of the beam, transverse to a central axis of the beam, in a radial direction determined by the disturbing vibration in the object structure.

With a circular cross-sectional beam shape the vibration absorber will vibrate at the natural resonant frequency in any radial direction of excitation. A rectangular beam may have two predominant arcuate vibration paths perperdicular to each other, each with a different natural resonant frequency, while a thin wide flat beam, i.e. a leaf spring, the predominant arcuate vibration path traverses the leaf spring perpendicular to its flat surface.

Since the mass and mechanical spring modulus are practically constant, the resultant resonant frequency is also constant, hence, due to the fixed tuning, a simple spring-mass TVA is effective only at or near its constant natural resonant frequency; a shift in the disturbing frequency can render the fixed-tuned TVA useless or even detrimental by generating spurious vibrations at the TVA's resonant frequency.

Vibration control in equipment with variable speed, such as in air/land/water vehicles requires variable-tuned TVA's whose natural resonant frequency can be adjusted to accomodate variations in the disturbing frequency, e.g. engine speed variations in an aircraft, boat or land vehicles.

A mechanically tunable vibration absorber can be retuned to a different frequency mechanically, optionally assisted hydraulically or pneumatically, e.g. by altering the beam length or the amount of mass, e.g. pumping liquid in or out, however such mechanical modes of manipulation are generally impractical, especially under operating conditions, therefore there is widespread need for a more agile and convenient mode of frequency adjustment for real-time manual control of vibration frequency, and especially for automatic control. By far the most agile and convenient mode of variable tuning would be an ETVA (electrically-tunable vibration absorber), e.g. where the resonant frequency can be varied by adjusting the amplitude of an electric current.

It is known that an air gap set up between a pair of opposed magnetic pole pieces exerts an attracting force between the pole pieces; thus by making one of the pole pieces movable relative to the other a "magnetic spring" can be formed: this force can be conveniently varied by adjusting the current in an electromagnet from which the gap is magnetized, changing the magnetic flux density. Thus an ETVA (electrically tuned vibration absorber) car be implemented electromagnetically by supplementing or even supplanting the mechanical spring suspension by an electromagnetic spring system that enables; the mass to vibrate at a resonant frequency that can be varied as a function of D.C. current in the electromagnet.

DISCUSSION OF RELATED KNOWN ART

U.S. Design Pat. No. 263,022 to Lilly, Jr. et al for a Vibration Isolator or Similar Article exemplifies the aforementioned common mechanical form of fixed-tuned TVA having a round beam attached to an enlarged head portion constituting the mass.

U.S. Pat. No. 4,150,588 to Brewer discloses a Dynamic Vibration Absorber, showing a fixed-tuned TVA with a spring beam of rectangular cross-section. The patent teaches very low damping to reduce or suppress the vibration of a system having a resonant frequency near its constant operating frequency.

As distinguished from the foregoing references disclosing purely mechanical fixed-tuned TVAs addressing constant frequency vibration, the following references disclose ETVA (electrically-tunable vibration absorption) apparatus that combines electromagnetic and mechanical aspects for accomplishing variable tuning of the vibration frequency.

U.S. Pat. No. 5,394,290 to Ushiyama et al discloses an Active Tuned Magnet Flux Rate Feedback Sensing Arrangement utilizing an electromagnetic sensor in a closed loop control of flux rate, that can be "tuned" for attenuating a narrow range of vibration frequencies in an arrangement that can be applied to a magnetic forcer/suspension system.

U.S. Pat. No. 4,710,656 to Studer discloses a Spring Neutralized Magnetic Vibration Isolator providing an electronically-controllable driven system with a single degree of freedom suspension element exhibiting substantially zero natural frequency of vibration. Non-resonance is obtained through a viscous damping effect from a combination of a spring, a mass, two permanent magnet circuits, and an electromagnetic coil driving a shunting/shorting armature.

U.S. Pat. No. 4,101,008 to Frosch et al for Arrangement for Absorbing Vibrations of a driven electromagnetic spring-mass system by means of an auxiliary spring mass system that oscillates out of phase with the driven system, both systems being guided along the same linear axis.

U.S. Pat. No. 4,724,923 to Waterman discloses a Vibration Absorber with Controllable Resonance Frequency having an electromagnetic yoke rigidly attached to the object structure which is the source of disturbing vibration and magnetically engaged through an air gap with a spring-supported body of magnetic material constituting the mass of a spring-mass TVA. The magnetic air gap varies in separation distance under vibration and opposes the effect of the spring, therefore D.C. current in the electromagnet lowers the resonant frequency compared the resonant frequency with no current. The armature disc being located between two magnetic poles creates two air gaps, one on each side; as the armature disc vibrates the separation width of these gaps vary in a complementary manner modulating the flux in each of the two magnetic loop paths and causing a continuous oscillation of the magnetic flux back and forth in the peripheral region of the armature disc.

All of the three patents immediately above, '656, '008 and '923, exemplify a key characteristic of conventional practice in ETVA's: variable separation distance of the gap(s) in the magnetic loop, typically the gap between a relatively fixed stator prominence and a vibratable armature prominence, facing each other. This repetitive variation in gap separation distance, as the armature vibrates relative to the stator, results in flux modulation and resultant eddy currents in the stator and armature core materials particularly at the prominent poles forming the gaps, introducing losses that lower the Q of the ETVA resonance substantially and thus impair the effectiveness and capability of the device as a vibration absorber. Such eddy current losses occur even when the DC in the coil winding is held constant, and they increase in severity with increasing frequency; remedying these losses can require costly counter-measures such as slots or laminations in the core materials.

OBJECTS OF THE INVENTION

It is a primary object of the present invention to provide a spring-mass ETVA whose resonant frequency can be varied within a designated frequency range under electrical control.

It is a further object to provide an electromagnetic circuit with a gap system that simulates the spring modulus of a spring-mass resonant system, i.e. wherein the returning force is proportional to the deflection of the mass from its central quiescent location.

It is a still further object to provide a tuned vibration absorber wherein the mechanical spring action is supplemented by a simulated spring action generated by the electromagnetic gap system, such that the resultant returning force from the electromagnetic system adds to that of the mechanical spring support structure, and therefore increasing the D.C. current in the electromagnet causes an increase in resonant frequency of the mass, thus constituting an ETVA (electrically-tunable vibration absorber).

It is an object to provide an embodiment of the ETVA that is implemented as beam-mass type wherein a support beam of spring material is cantilever-mounted at its base end onto the object structure and carries the mass at the opposite end, the mass being thus vibratable in an arcuate path traversing the axis of the beam perpendicularly.

It is a further object to provide a beam-mass ETVA embodiment wherein the vibration of the mass is confined to a path in a plane containing the beam axis and oriented in a particular predetermined direction relative thereto.

Alternatively it is an object to provide a unidirectional version of the beam-mass embodiment of the ETVA wherein the mass is vibratable in any direction of excitation generally perpendicular to the beam axis.

It is another object to provide alternative embodiments of the ETVA implemented as a linear motion type having a mass that is suspended so as to vibrate in a linear longitudinal path along a main central axis.

SUMMARY OF THE INVENTION

The above mentioned objects have been accomplished in the present invention of an ETVA (electrically-tunable vibration absorber) wherein the magnetic flux path of an electromagnetic system is made to traverse a gap comprising a pair of oppositely-facing matching magnetic pole structures, each configured as an array that matches its opposite counterpart in mirror-image relationship. One pole array is attached to a vibratable mass portion of TVA while the other pole array is substantially attached to the object structure that is being treated to suppress vibration. The two interfacing arrays are generally configured in mirror-image relationship as seen in cross-section, and are made and arranged to move relative to each other only in a lateral direction under vibration so that the gap separation distance remains substantially constant and thus the flux density remains substantially constant and unmodulated.

In a beam-mass embodiment the mass is attached to the free end of a cylindrical beam that is attached in a cantilever manner at its other end to the subject vibrating body which travels in an arcuate path.

In a linear-motion embodiment the mass is formed as vibratable cylindrical core surrounded by a tubular stator shell, the armature and the stator having mutually-interfacing magnetic pole patterns spaced apart by a constant gap separation dimension.

BRIEF DESCRIPTION OF THE DRAWINGS

The above and further objects, features and advantages of the present invention will be more fully understood from the following description taken with the accompanying drawings in which.

DETAILED DESCRIPTION

Figure 1:
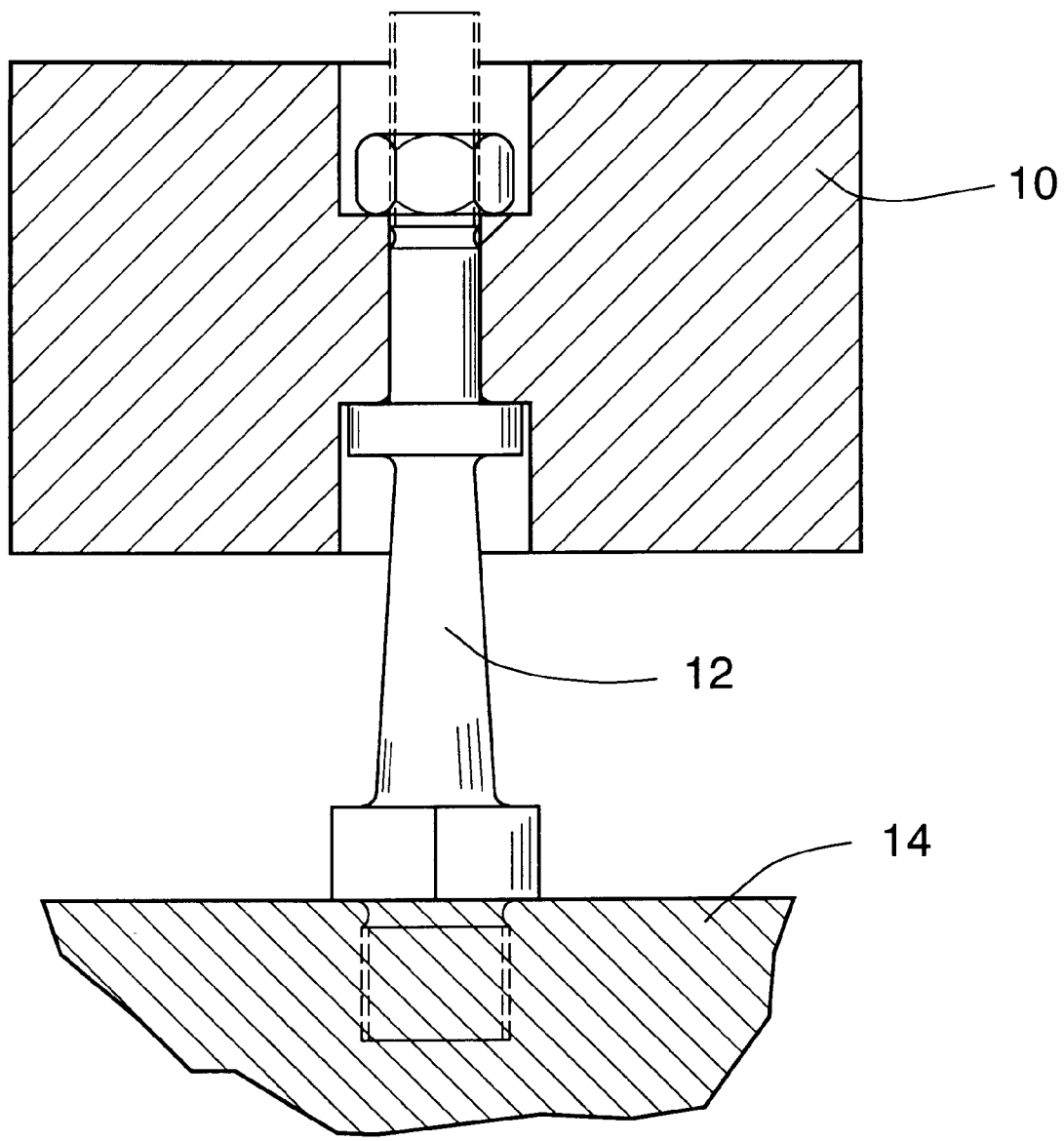
FIG. 1 is a cross-sectional view of a beam-mass type TVA (tuned vibration absorber) of known art.

FIG. 1, a cross-sectional view of a beam-mass type TVA (tuned vibration absorber) of known art, shows a vibratable mass 10, typically a cylindrical steel block, fastened to a beam 12 which is mounted in cantilever fashion to an object structure 14, shown in cutaway part, from which vibrational disturbance is to be absorbed. Such disturbance excites mass 10 to vibrate relative to the structure 14 due to flexure of the beam 12, and this vibration reacts back through beam 12 in a manner that tends to absorb the disturbing vibration from object structure 14.

Figure 2:
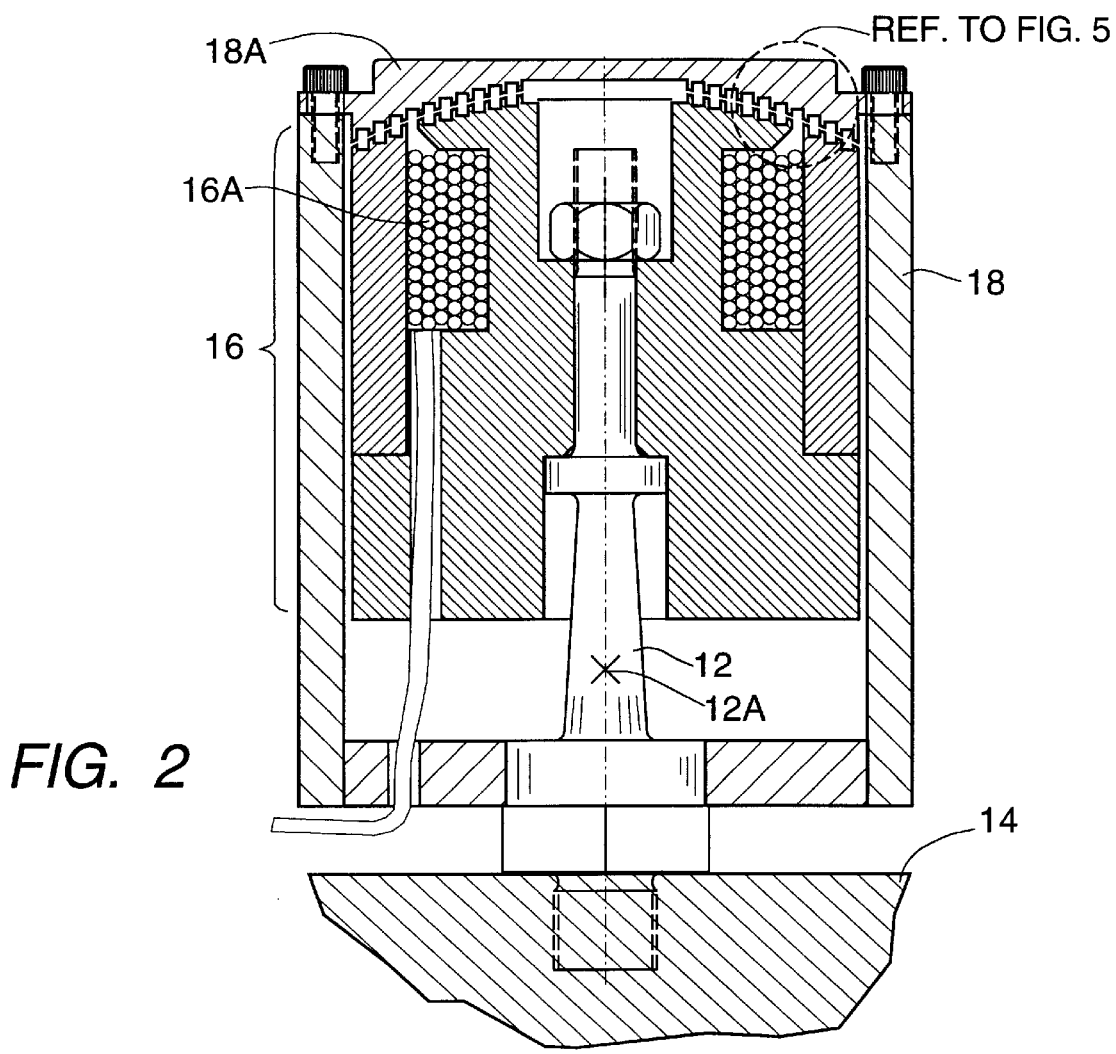
FIG. 2 is a cross-sectional view of an ETVA (electrically-tunable vibration absorber) illustrating a basic beam-mass embodiment of the present invention.

FIG. 2 is a cross-sectional view of an ETVA (electrically-tunable vibration absorber) illustrating a preferred beam-mass embodiment of the present invention. As in FIG. 1, beam 12, attached to the object structure 14, carries a vibratable mass, however in FIG. 2 the vibratable mass is an armature-mass 16 that includes a coil winding 16A surrounded by ferro-magnetic core material and that has an upper surface, configured as a pattern of mesa-like prominences with faces conforming to a portion of a sphere that defining the travel path of the upper surface under vibration, centered on a virtual flexure pivot point 12A located part way up from the base of beam 12.

Armature-mass 16 is closely surrounded by a tubular wall 18 which is made of non-magnetic metal to avoid flux losses and which is attached at its lower end to beam 12, and thus essentially attached to object structure 12, along with the base of beam 12.

A cover cap 18A is attached to the top of wall 18 so as to form a stator housing enclosure around armature-mass 16. The lower surface of cover cap 18A is configured with a pattern of prominences having faces matching and interfacing those on the top of armature-mass 16, separated by a uniform air gap throughout the spherical region.

Figures 3, 4:
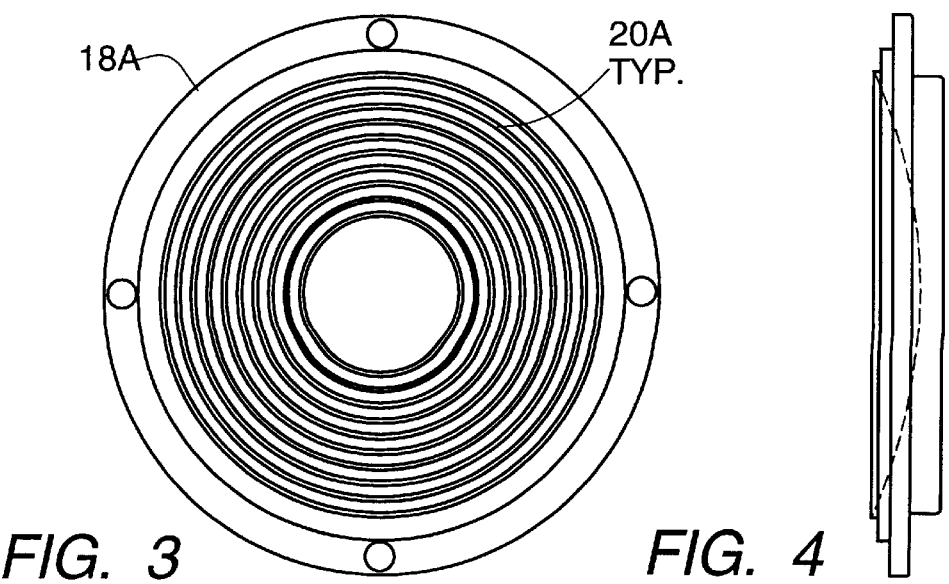
FIG. 3 is a bottom view of the cover cap of the ETVA of FIG. 2 showing a particular pole pattern as seen on the lower side of the cover cap.
FIG. 4 is a side view of the cover cap of FIG. 3.

FIG. 3 shows the pattern of prominences on the lower surface of cap 18A as seen from below: an array of uniformly spaced concentric circular prominences.

FIG. 4 is a side view of the cover cap 18A of FIG. 3, showing in a dashed line the concave circular cross sectional shape of the spherical plane of interfacing ends in the pattern of prominences.

Figure 5:
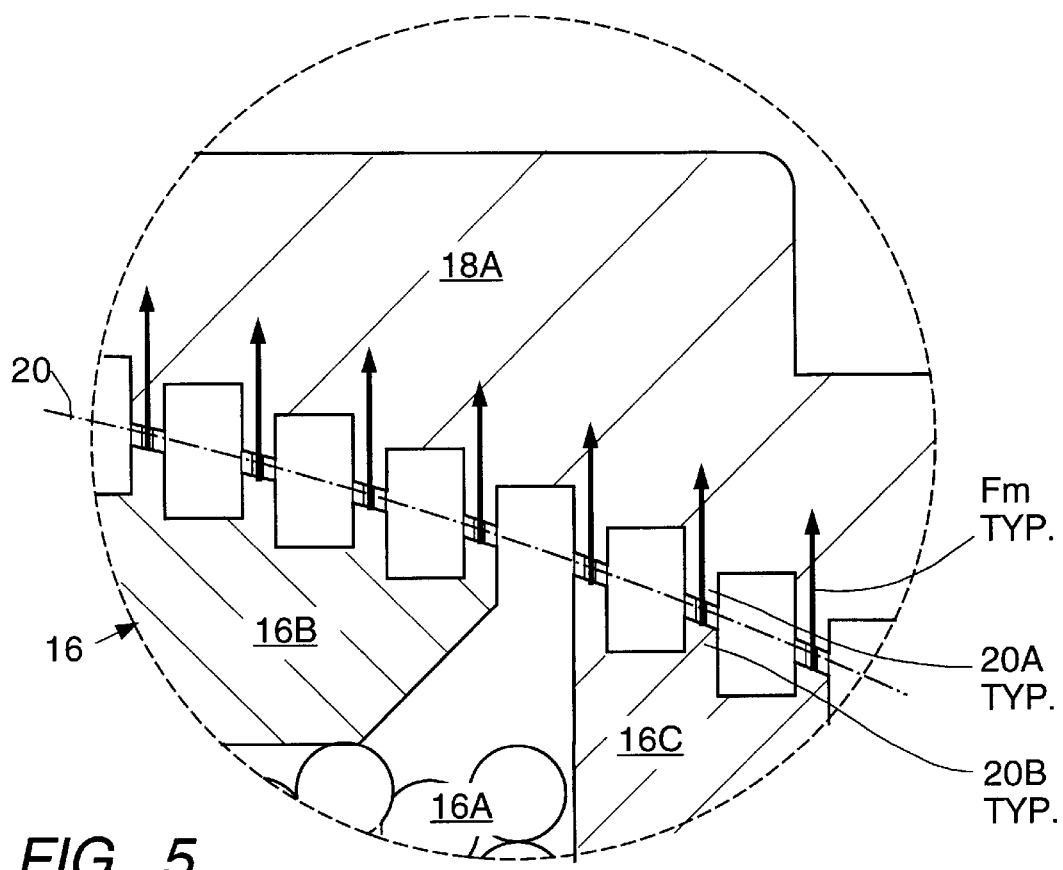
FIG. 5 is an enlargement of a portion of the interface between the pole prominences of the armature-mass and those of the stator-housing cover cap of FIG. 2, with the armature-mass located in centered quiescent position wherein the two pole patterns are in alignment.

FIG. 5 is an enlargement of the region circled in FIG. 2 showing seven pairs of pole prominences 20A/20B interfacing between the armature-mass 16 and cover cap 18A of FIG. 2; the armature-mass 16 is located in its centered quiescent position such that the two pole patterns are made to align with each other as shown in cross-section. The magnetic flux lines and thus the magnetic attractive forces Fm in each gap act in a vertical direction as indicated by the seven upwardly-directed arrows Fm, thus there is no lateral force exerted on the armature-mass 16, and it tends to remain in or return to the neutral centered position shown.

The armature-mass 16 is assembled around coil winding 16A to form two electromagnet prominent pole regions 16B and 16C with a relatively large air gap between them such that the magnetic flux due to DC (direct current) in coil winding 16A is forced to flow from one of these magnetic pole regions through a first set of prominences (four at the left side of FIG. 5) and associated gaps to the cover cap 18A and then return to the other (oppositely signed) magnetic pole region through the other set of prominences (three at the right side of FIG. 5) and their associated air gaps.

Figure 5A:
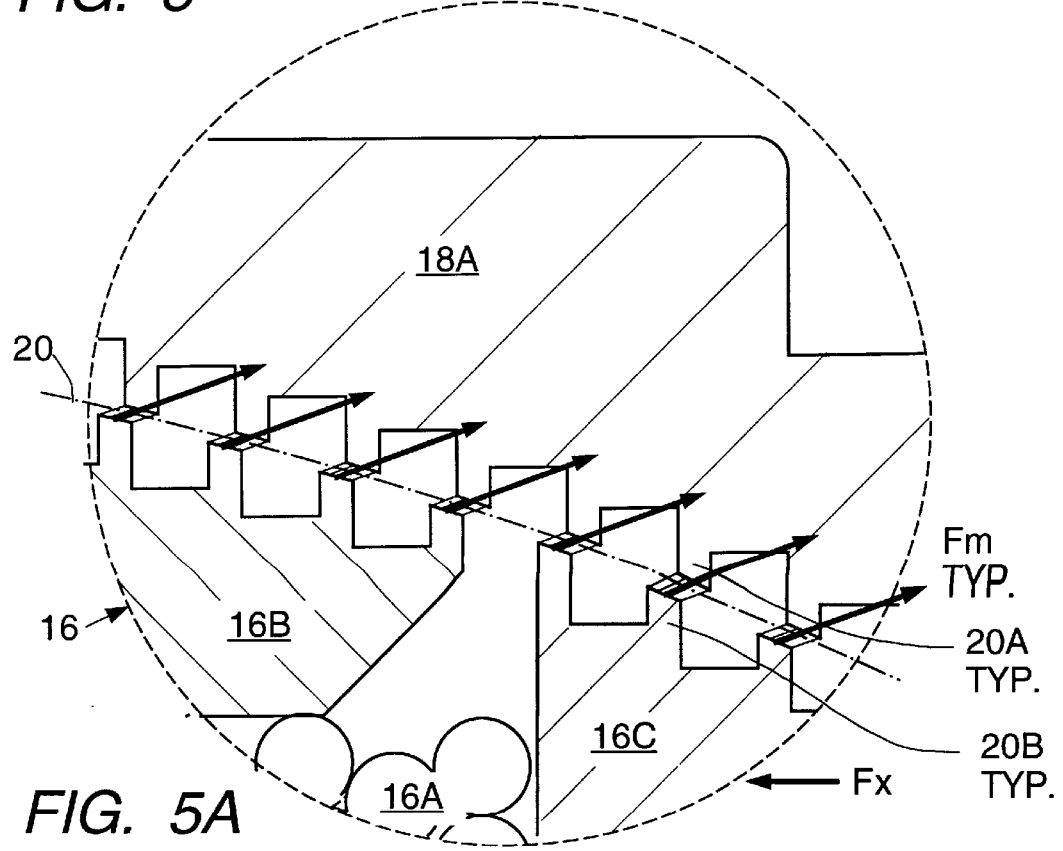
FIG. 5A shows the elements of FIG. 5 with the mass/armature deflected to an off-center position wherein its pole patterns are offset from each other.

FIG. 5A shows the elements of FIG. 5 after armature-mass 16 has been deflected by external force, arrow Fx, to the left to is the off-center position shown where the two pole patterns are offset from each other. Although the air gap separation has not changed, the flux lines are skewed to the angle indicated by the seven arrows Fm which now point predominantly to the right, thus a restoring force Fm is exerted on armature-mass 16 equivalent to a mechanical spring urging it to the right, and this restoring force Fm can be varied by adjusting the DC flowing in coil winding 16A. For a given DC value, this simulates a mechanical spring in that the restoring force increases with increasing deflection, at least for small values of deflection; the effects of the electromagnetic spring and the mechanical spring are additive so that tuning of the resonant frequency of the vibrating mass can be accomplished by adjusting the DC in the coil winding so as to vary the spring effect.

The pole pattern shown in FIG. 3 acts in an omnidirectional manner, i.e. uniformly in any perpendicular direction about the central axis of beam 12 (FIG. 2), the maximum peak-to-peak working deflection being limited to less than the pitch between adjacent ones of the concentric circular prominences 20A/20B (FIG. 5, 5A).

It is to be noted that the prominences are shaped such that the interfacing surfaces are in a spherical plane that corresponds to the cross-sectional arcuate travel path 20 of the upper periphery of the armature-mass under vibration, such that the gap separation distance always remains constant while the armature-mass reciprocates about the central quiescent position shown in FIG. 5.

This constant gap separation, as the key principle taught by the present invention, minimizes flux modulation in the pole regions and associated eddy current losses that, as described above, degrade the performance of other electromagnetic systems such as solenoids having air gaps that vary in separation distance under vibration/actuation and create substantial flux modulation in the magnetic materials. In FIGS. 5 and 5A it is seen that, within a working range, although there is a geometric increase in flux density within the air gaps when the prominences become offset, the total flux handled by each pair of prominences remains relatively constant, therefore the absence of flux modulation in the magnetic materials avoids eddy current losses.

Figure 6:
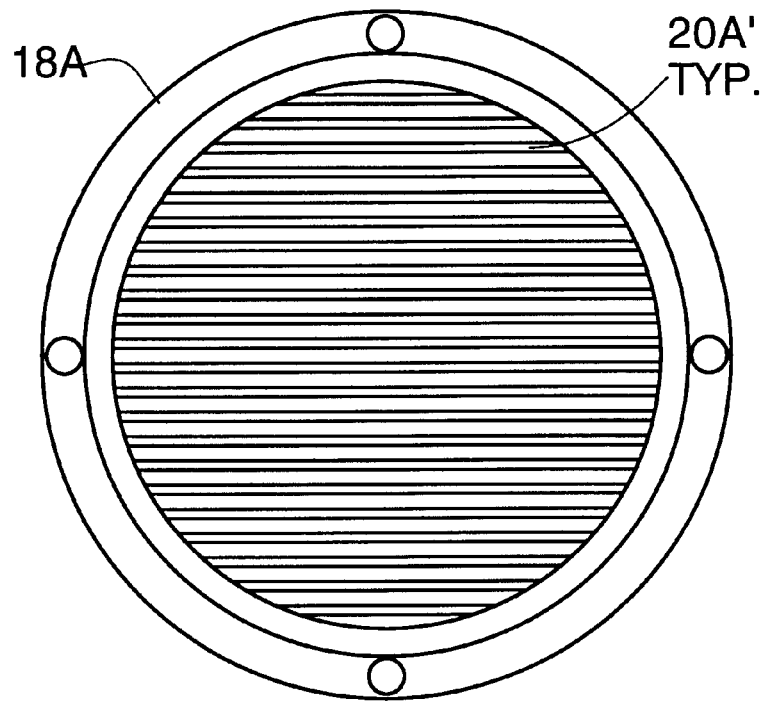
FIG. 6 depicts an alternative parallel linear pole pattern that causes the ETVA to function unidirectionally.

FIG. 6 depicts a pattern for the prominences 20A' of the armature-mass (and matching prominences for the stator-housing) that, as an alternative to that shown in FIG. 3, would cause the ETVA of the present invention to function in a unidirectional manner such that armature-mass vibration will be along an axis that is substantially perpendicular to the parallel pattern, e.g. vertical in FIG. 6, thus the ETVA will be most efficient in suppressing vibrational disturbance along that axis and will be least efficient in a direction that is parallel to the pattern.

Figure 7:
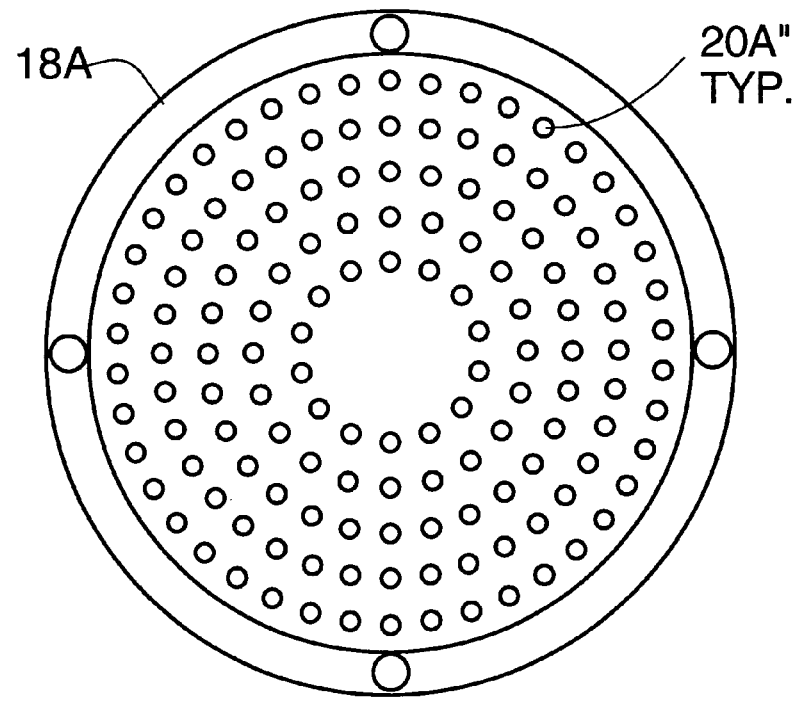
FIG. 7 depicts an alternative pole pattern of isolated prominences providing omnidirectional vibration absorption.

FIG. 7 depicts another alternative pole pattern with which ETVA of this invention may be practiced, configured as an array of a large number of small isolated mesa-like prominences 20A" (and matching prominences for the stator housing). The fragmented pattern, especially with the round individual shape as shown, would cause the ETVA to be non-directional in operation; however the individual prominences could also be made square or hex-shaped, or elongated, e.g. oval or rectangular, and could be arranged to favor vibration absorption in particular directions.

Figure 8:
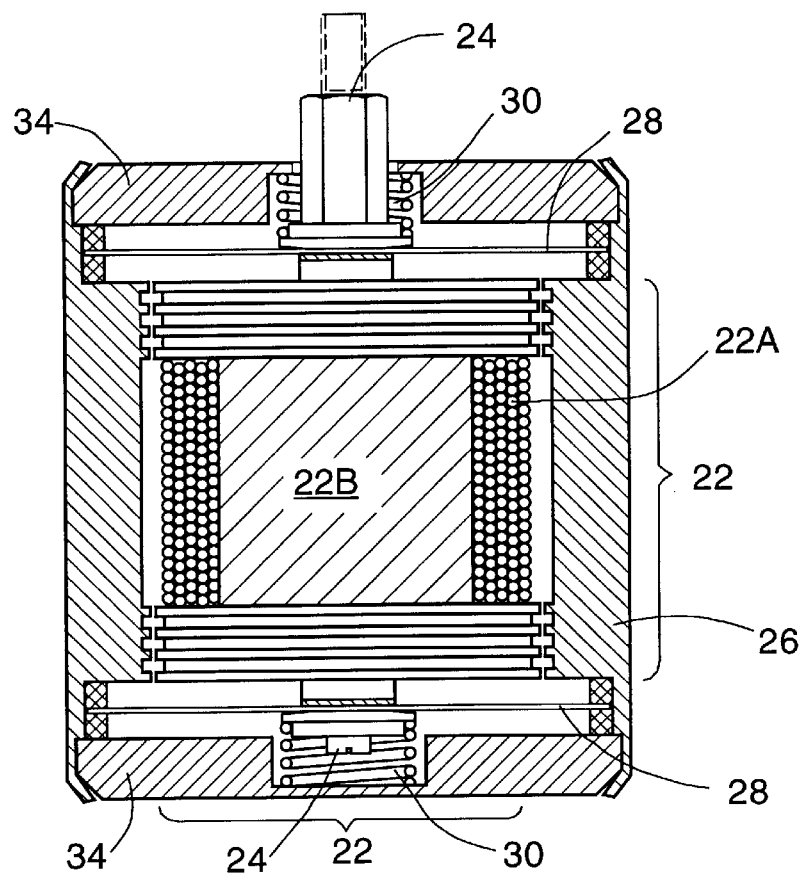
FIG. 8 is a cross-sectional representation of a linear-motion embodiment of an ETVA according to the present invention having a housing surrounding and suspending an electromagnetic core with a central mounting shaft extending through an end of the housing.

FIG. 8 is a cross-sectional representation of a linear-motion embodiment of the present invention wherein the ETVA is configured coaxially with a housing 26 of magnetically permeable material such as soft iron surrounding and end-supporting cylindrical electromagnetic core assembly 22 and its central shaft 24 by two end flexures 28 positively constraining shaft 24 radially and cooperating with two end coil springs 30 to provide axial spring constraint such that vibration between the core assembly 22 and housing 26 is confined to a linear path in the direction of the central axis of the assembly.

Core assembly 22 is configured as a bobbin carrying coil winding 22A on central core 22B with end portions configured with a row of annular prominences facing a matching row of annular prominences disposed around the inside of housing 26.

The core assembly is mounted securely to the object structure via shaft 24 so as to transmit the disturbing vibration axially through the shaft to core assembly 22 which acts as the stator. The housing 26 acts as the vibratable mass; it is excited from the stator core assembly 22 to vibrate axially relative thereto (vertically as shown) and thus provide the desired TVA function.

As described above for other ETVA embodiments, the resonant frequency of vibration can be tuned to the frequency of the disturbing vibration by adjusting the DC in coil winding 26.

Figure 9:
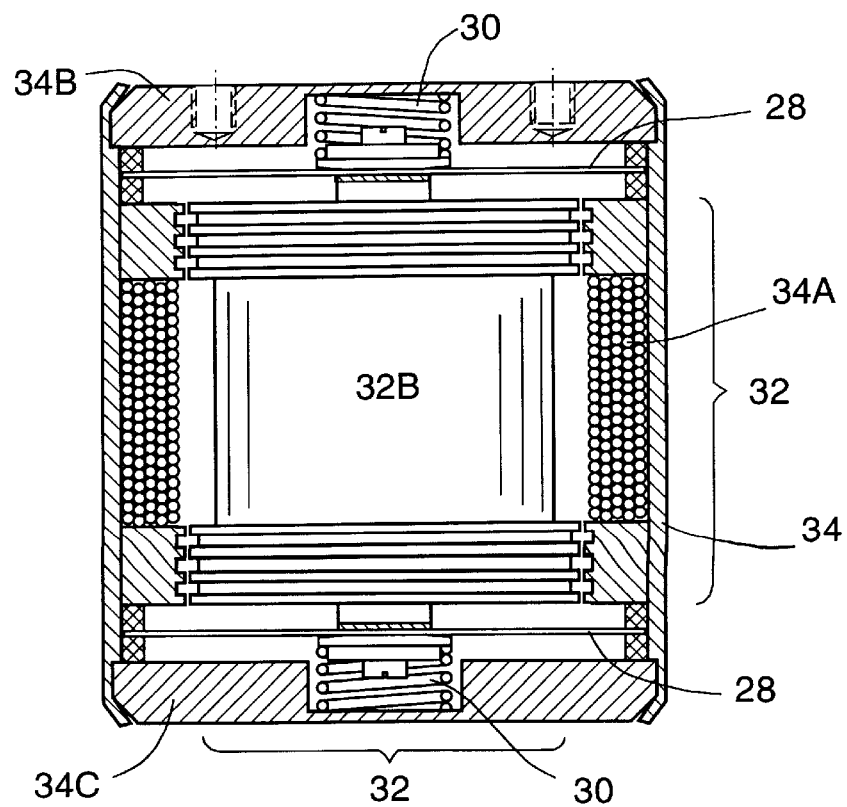
FIG. 9 is a cross-sectional representation of a linear-motion embodiment of an ETVA according to the present invention having an electromagnetic stator-housing surrounding and suspending a vibratable armature-mass.

FIG. 9 is a cross-sectional representation of another linear-motion embodiment of an ETVA according to the present invention, this one having a housing 34 which contains coil windings surrounding a cylindrical core assembly 32 that is supported and constrained, as in FIG. 8, by flexures 28 and coil springs 30 so as to be vibratable in an axial direction relative to housing 34.

Core assembly 32 is made from magnetically permeable material; its main core portion 32B configured each end with a row of annular prominences facing a matching row of annular prominences disposed at each end of core portion 32B, in a configuration generally similar to that of FIG. 8.

The ETVA of FIG. 9 is attached firmly to the object structure at one of the endplates 34B or 34C of housing 34, e.g. via bolts engaging threaded holes shown in the upper endplate 34B. The housing 34 with coil winding 34A and endplates 34B and 34C thus serve as the stator while the core portion 32B serves as the axially vibratable mass of the ETVA, which, as described above for other embodiments, can be tuned by varying the DC in coil winding 34A.

The coil winding location option, i.e. on the core 22 as in FIG. 8 or on the housing as in FIG. 9, and the object structure attachment option, i.e. to the shaft 23 as in FIG. 8 or to the housing as in FIG. 9, are generally independent of each other, so there could be other overall configurations such as:

(a) omitting the external shaft 24 in FIG. 8 and providing mounting to the object structure via end plate 34, and (b) adding an external shaft to core assembly 32 for mounting to the object structure so that core assembly 32 is made to act as the stator while housing 34 with coil winding 34A is made to act as the vibratable mass; larger values of mass are more readily obtained with this configuration (b) than with configuration (a).

Generally parts that play a structural (but not magnetic) role, such the housing 18 and its lower end plate in the beam-mass type (FIG, 2), and end plates 34A/B/Cin the linear motion ETVA (FIGS. 8, 9), are made from non-magnetic metal or rugged plastic material so as to avoid any air gap in the magnetic path that could vary in separation spacing under vibration.

The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein

What is claimed is:

1. An electrically-tunable vibration absorber, for absorbing vibration from an object structure disturbed by the vibration, comprising:

a vibratable mass;

a spring suspension system having a predetermined spring modulus connecting the vibratable mass to the object structure in a manner that enables the mass to vibrate within predetermined path constraints at a self-resonant frequency determined by the mass and the spring modulus, responsive to vibrational excitation received from the object structure;

a first set of prominent poles incorporated in said vibratable mass, arranged in a predetermined pole pattern, each prominent pole having a pole-end face disposed in a first plane defining a vibratory travel path of a corresponding peripheral region of said vibratable mass;

a second set of prominent poles in substantial massive attachment with the object structure, arranged in the predetermined pole pattern, facing said first set of prominent poles, each prominent pole in the second set having a pole-end face disposed in a second plane parallel with the first plane and separated therefrom by an air gap of predetermined uniform separation spacing; and an electromagnet system incorporated in said vibration absorber, including at least one coil winding and associated magnetic material constructed and arranged to generate a magnetic flux traversing the air gap between said two sets of prominent poles at a substantially uniform flux density resulting from direct current applied to the coil winding;

said spring suspension system being constructed and arranged to (a) hold said first and second set of prominent poles mutually aligned under quiescent conditions such that lines of the magnetic flux are caused to be perpendicular to said first and second planes and to thus exert no motivational force between th two sets of prominent poles and therefore no motivational force between the mass and the object structure, and (b) to constrain vibration of said mass along with said first set of poles so as to occur only in directions that are substantially parallel with said first and second planes such that the predetermined gap separation spacing remains constant under vibratory travel;

whereby, whenever said first set of prominent poles is deflected relative to said second set of poles due to vibration of the mass, consequent warping of the flux lines away from perpendicular exerts a restoring force which supplements restoring force provided from said spring suspension system thus increasing the frequency of natural vibration by an amount that can be controlled by adjusting the amplitude of direct current in the coil winding of said electromagnet system, thus providing an electrically-tunable vibration absorber (ETVA).

2. The electrically-tunable vibration absorber as defined in claim 1 wherein said vibratable mass is configured to be generally cylindrical in shape centered about a central axis.

3. The electrically-tunable vibration absorber as defined in claim 2 further comprising a housing, surrounding said vibratable mass, in substantial massive attachment with the object structure and with the second set of prominent poles.

4. The electrically-tunable vibration absorber as defined in claim 3 wherein said cylindrical vibratable mass is constructed and arranged to constitute an armature assembly containing the coil winding along with magnetic material operationally linking the coil winding with said first set of prominent poles, as elements of said electromagnet system.

5. The electrically-tunable vibration absorber as defined in claim 4 wherein:

said spring suspension system comprises an elongated beam o circular cross-section having a base end attached to the object structure and a vibratable end, opposite the base end, attached coaxially to said cylindrical vibratable mass about the central axis;

the armature assembly constituting the cylindrical vibratable mass is made from magnetic material configured with an articulated end surface defining said first set of prominent poles disposed at an extreme end thereof, opposite said beam; and the first plane is shaped as a portion of a spherical surface defining potential travel paths of the articulated end surface under vibration shaped as arcs centered in said beam on a virtual center of radial vibration as characterized by flexure of said beam.

6. The electrically-tunable vibration absorber as defined in claim 5 wherein said elongated beam is made to have a main flexing portion tapered from a larger base end to a smaller vibratable end.

7. The electrically-tunable vibration absorber as defined in claim 6 wherein the armature assembly is configured and arranged to provide a polarization air gap that divides the articulated end surface into two magnetic zone portions associated respectively with two oppositely-signed magnetic poles generated by said electromagnet system.

8. The electrically-tunable vibration absorber as defined in claim 7 wherein said housing comprises a tubular shell portion to which is attached at a first end to a base plate in substantial massive attachment to the object structure and at a second end opposite the base end to an outer end plate in massive attachment with said second set of prominent poles which are thusly made to be massively attached to the object structure.

9. The electrically-tunable vibration absorber as defined in claim 8 wherein the predetermined pattern of said first and second sets of prominent poles is configured as a series of uniformly separated circular walls of graduated diameters disposed about the central axis, said first set of prominent poles including an outer magnetic zone portion of larger diameter circular walls and an inner magnetic zone portion of smaller diameter circular walls, the two magnetic zone portions being separated by the polarization air gap, which is generally annular in shape and made to increase in gap separation spacing inwardly toward the coil windings;

whereby said vibration absorber is enabled to absorb vibration in any direction perpendicular to the central axis.

10. The electrically-tunable vibration absorber as defined in claim 8 wherein:

the predetermined pattern of said first and second sets of prominent poles is configured as a plurality of like prominent poles distributed in approximately uniform density throughout the outer end region of the armature assembly, said first set of prominent poles consisting of an outer annular magnetic zone portion of larger diameter and an inner magnetic zone portion of smaller diameter, the two magnetic zone portions being separated by the polarization air gap, which is generally annular in shape and made to increase in gap separation spacing inwardly toward the coil windings; and whereby said vibration absorber is enabled to absorb vibration in any direction perpendicular to the central axis.

11. The electrically-tunable vibration absorber as defined in claim 10 wherein each of the prominent poles is configured with a circular cross-sectional shape.

12. The electrically-tunable vibration absorber as defined in claim 8 wherein the predetermined pattern of said first and second sets of prominent poles is configured as a plurality of uniformly-spaced parallel walls defining geometric chords across the circular outer end region of the armature assembly;

whereby said vibration absorber is enabled to absorb vibration in a direction perpendicular to the central axis and perpendicular to the parallel walls.

13. The electrically-tunable vibration absorber as defined in claim 2 in an axial linear vibration travel embodiment further comprising:

a tubular housing of magnetic material configured with a pair of inwardly-facing annular pole structures each facing inwardly, each configured with a plurality of uniformly spaced annular prominent poles constituting a half portion of said first set of prominent poles with end faces disposed in a first tubular plane concentric with the central axis;

a cylindrical electromagnetic armature assembly shaped as a bobbin and containing the electromagnet system with the coil winding surrounding a central core of magnetic material having end portions defining a pair of annular oppositely-signed magnetic pole structures one at each end of the armature assembly facing outwardly toward a corresponding one of the magnetic pole structures on the armature assembly, each pole structure configured with a plurality of uniformly spaced annular prominent poles constituting a half portion of said second set of prominent poles with end faces disposed in a second tubular plane concentric with the central axis and thus uniformly spaced apart from said first tubular plane by a predetermined gap separation; and a shaft extending axially from said armature assembly constructed and arranged to in effect massively attach the set of prominent poles to the object structure for the purpose of transmitting vibrational energy in an axial direction.

14. The electrically-tunable vibration absorber as defined in claim 13 wherein said spring suspension system comprises:

a pair of flexure devices, disposed one at each end of said armature assembly, each fastened centrally to a corresponding end of said armature assembly and fastened peripherally to a corresponding end region in said tubular housing so as to provide positive constraint between said housing radially, and to provide vibratable constraint therebetween axially in such a manner as to hold said first and second sets of prominent poles in alignment in the absence of vibration;

whereby said vibration absorber is enabled to absorb vibration in an axial direction parallel with the central axis.

15. The electrically-tunable vibration absorber as defined in claim 14 wherein said spring suspension system further comprises a pair of coil springs disposed one at each end of said armature assembly and placed under compression between said armature assembly and a corresponding one of a pair of end plate attached to said housing one at each end thereof.

16. The electrically-tunable vibration absorber as defined in claim 8 in an axial linear vibration travel embodiment wherein:

said tubular shell portion of said housing is of magnetic material configured with a pair of inwardly-facing annular pole structures, each configured with a plurality of uniformly spaced annular prominent poles constituting a half portion of said first set of prominent poles with end faces disposed in a first tubular plane concentric with the central axis;

the electromagnetic armature assembly is shaped as a bobbin with the coil winding surrounding a central core of magnetic material having end portions defining a pair of annular oppositely-signed magnetic pole structures one at each end of the armature assembly facing outwardly toward a corresponding one of the magnetic pole structures on the armature assembly, each pole structure configured with a plurality of uniformly spaced annular prominent poles constituting a half portion of said second set of prominent poles with end faces disposed in a second tubular plane concentric with the central axis and thus uniformly spaced apart from said first tubular plane by a predetermined gap separation.

17. The electrically-tunable vibration absorber as defined in claim 16 wherein said spring suspension system comprises:

a pair of flexure devices, disposed one at each end of said armature assembly, each fastened centrally to a corresponding end of said armature assembly and fastened peripherally to a corresponding end region in said tubular housing so as to provide positive radial constraint between said housing and said armature assembly, and to provide resilient axial constraint therebetween in such a manner as to hold said first and second sets of prominent poles in alignment in the absence of vibration;

whereby said vibration absorber is enabled to absorb disturbing vibration in an axial direction parallel with the central axis.

18. The electrically-tunable vibration absorber as defined in claim 17 wherein:

said housing further comprises a pair of end plates attached thereto one at each end thereof; and said spring suspension system further comprises a pair of coil springs disposed one at each end of said armature assembly in a central region thereof and placed under compression between the armature assembly and a corresponding one of said end plates.

* * * * *

UNITED STATES PATENT AND TRADEMARK OFFICE
CERTIFICATE OF CORRECTION

PATENT NO.   : 6,006,875
DATED        : December 28, 1999
INVENTOR(S)  : Frederik T. van Namen It is certified that error appears in the above-identified patent and that said Letters Patent is hereby corrected as shown below:

<u>Title page,</u>
Insert item [73], to read as follows: -- Motran Industries, Inc., Valencia, CA --

Signed and Sealed this

Thirtieth Day of July, 2002

*Attest:*

JAMES E. ROGAN
*Attesting Officer*      *Director of the United States Patent and Trademark Office*